United States Patent
Kim

(10) Patent No.: US 11,181,114 B2
(45) Date of Patent: Nov. 23, 2021

(54) COOLING FAN

(71) Applicant: AMOTECH CO., LTD., Incheon (KR)

(72) Inventor: Byung Soo Kim, Anyang-si (KR)

(73) Assignee: AMOTECH CO., LTD., Incheon (KR)

( * ) Notice: Subject to any disclaimer, the term of this patent is extended or adjusted under 35 U.S.C. 154(b) by 0 days.

(21) Appl. No.: 16/652,226

(22) PCT Filed: Dec. 5, 2018

(86) PCT No.: PCT/KR2018/015311
§ 371 (c)(1),
(2) Date: Mar. 30, 2020

(87) PCT Pub. No.: WO2019/112315
PCT Pub. Date: Jun. 13, 2019

(65) Prior Publication Data
US 2020/0300254 A1 Sep. 24, 2020

(30) Foreign Application Priority Data

Dec. 6, 2017 (KR) .................. 10-2017-0166773

(51) Int. Cl.
*F04D 25/06* (2006.01)
*H02K 11/00* (2016.01)
*F04D 19/00* (2006.01)

(52) U.S. Cl.
CPC ....... *F04D 25/0646* (2013.01); *F04D 19/002* (2013.01); *F04D 25/0693* (2013.01); *H02K 11/0094* (2013.01)

(58) Field of Classification Search
CPC ............... F04D 19/002; F04D 25/0613; F04D 25/0646; F04D 25/0693; H02K 11/01;
(Continued)

(56) References Cited

U.S. PATENT DOCUMENTS 7,589,444 B2 * 9/2009 Teshima ................ H02K 29/08
310/67 R
8,092,195 B2 * 1/2012 Muraoka ............. F04D 25/0633
417/354
(Continued)

FOREIGN PATENT DOCUMENTS

JP 2009148103 7/2009
JP 2010142041 6/2010
(Continued)

OTHER PUBLICATIONS

International Search Report—PCT/KR2018/015311 dated Mar. 6, 2019.

*Primary Examiner* — Devon C Kramer
*Assistant Examiner* — Joseph S. Herrmann
(74) *Attorney, Agent, or Firm* — Cantor Colburn LLP

(57) ABSTRACT

A cooling fan includes: a rotary shaft which is rotatably supported in a fan housing; a rotor which is fixed to the rotary shaft; a stator which is fixed to the fan housing, is arranged so as to be arranged at a predetermined gap away from the rotor, and includes a plurality of stacked stator cores on which a coil is wound; an impeller which is connected to the rotor; a printed circuit board (PCB) which is installed on the bottom side of the stator and controls the cooling fan; and a ground portion which is installed on the stator cores, is electrically connected to a ground pattern of the PCB and expands a ground surface. Thus, damage of circuit components due to electrostatic electricity is prevented, and EMI shielding properties are improved.

6 Claims, 4 Drawing Sheets

(58) Field of Classification Search
CPC ... H02K 11/02; H02K 11/024; H02K 11/0094
See application file for complete search history.

(56) References Cited

U.S. PATENT DOCUMENTS

| | | |
|---|---|---|
| 2005/0168083 A1 | 8/2005 | Ku et al. |
| 2005/0184605 A1* | 8/2005 | Vinson ................ F04D 25/0646 310/68 R |
| 2007/0252451 A1* | 11/2007 | Shibuya ................... H02K 7/14 310/64 |
| 2010/0104455 A1 | 4/2010 | Tsai et al. |
| 2017/0146033 A1* | 5/2017 | Pacilli ................... F04D 29/043 |

FOREIGN PATENT DOCUMENTS

| | | |
|---|---|---|
| KR | 20100027900 | 3/2010 |
| KR | 101547495 | 8/2015 |

* cited by examiner

COOLING FAN

TECHNICAL FIELD

The present invention relates to a cooling fan for preventing overheating of electronic devices, automobiles, LED lightings or the like, and more particularly to a cooling fan that prevents damage to circuit components due to static electricity and has improved electromagnetic interference (EMI) blocking performance.

BACKGROUND ART

Cooling fans are mainly used to prevent overheating of various electronic devices, LED lights, or various components mounted in automobiles.

A cooling fan includes a rotating shaft rotatably supported in a fan housing, a rotor fixed to the rotating shaft, a stator fixed to the fan housing and disposed with a predetermined gap from the rotor, and an impeller fixed to the rotor and rotating with the rotor.

Devices such as a cooling fan using an electromagnetic field generate electromagnetic waves by the electromagnetic field during driving. Electromagnetic waves may degrade the drive output of a motor itself and degrade the function of electronic devices in a system where the cooling fan is mounted.

In particular, in the case of a cooling fan used for a vehicle, electromagnetic waves generated by the cooling fan have a fatal adverse effect on various electronic devices provided in the vehicle, thereby degrading even the function of sensitive electronic devices such as the sudden unintended acceleration prevention due to an abnormality in a vehicle, the abnormal screen output of an instrument panel provided inside the vehicle, the abnormal control operation of a microcomputer in the vehicle, or the like.

In order to solve this problem, a motor device disclosed in Korean Patent Publication No. 10-1547495 (published on Aug. 20, 2015) is provided with a controller to control a motor, and a filter unit for blocking electromagnetic waves is installed in the controller.

Such a conventional motor has a problem that the structure is complicated and the manufacturing cost increases because a separate filter unit is provided to block electromagnetic waves.

DISCLOSURE

Technical Problem

It is an object of the present invention to provide a cooling fan capable of preventing damage to circuit components due to static electricity and improving electromagnetic interference (EMI) blocking performance by directly electrically connecting a stator core made of metal to the ground of a printed circuit board (PCB) to expand an area of the ground.

Technical Solution

In order to achieve the object, a cooling fan, according to the present invention, comprises: a plurality of stator cores which are fixed to a fan housing and arranged at a predetermined gap from a rotor, in which the plurality of stator cores are stacked; a bobbin mounted on the outer surfaces of the stator cores; a stator including a coil wound on the bobbin, and supplied with electric power; a printed circuit board (PCB) installed under the stator to control the cooling fan; and a grounding portion installed on the stator core and electrically connected to the ground of the PCB to expand a ground area.

The grounding portion includes a connection groove formed in the stator core, and a joint pin inserted into the connection groove to electrically connect the stator core to the PCB.

A start line connection portion to which a start line of the coil is connected, an end line connection portion to which an end line of the coil is connected, and a joint pin connection portion to which a joint pin is connected, may be formed on the PCB, and the joint pin connection portion may be formed on a PCB and connected to a pattern that can serve as the ground.

Advantageous Effects

As described above, in the present invention, by forming the connection hole portion in the stator cores stacked and formed in a plurality of pieces of stator cores, the joint pin is inserted into the connection hole portion, and the joint pin is electrically connected to a ground pattern of the PCB to expand the ground area, resulting in preventing damage to circuit components due to static electricity and improving EMI blocking performance.

BEST MODE

Figure 1:
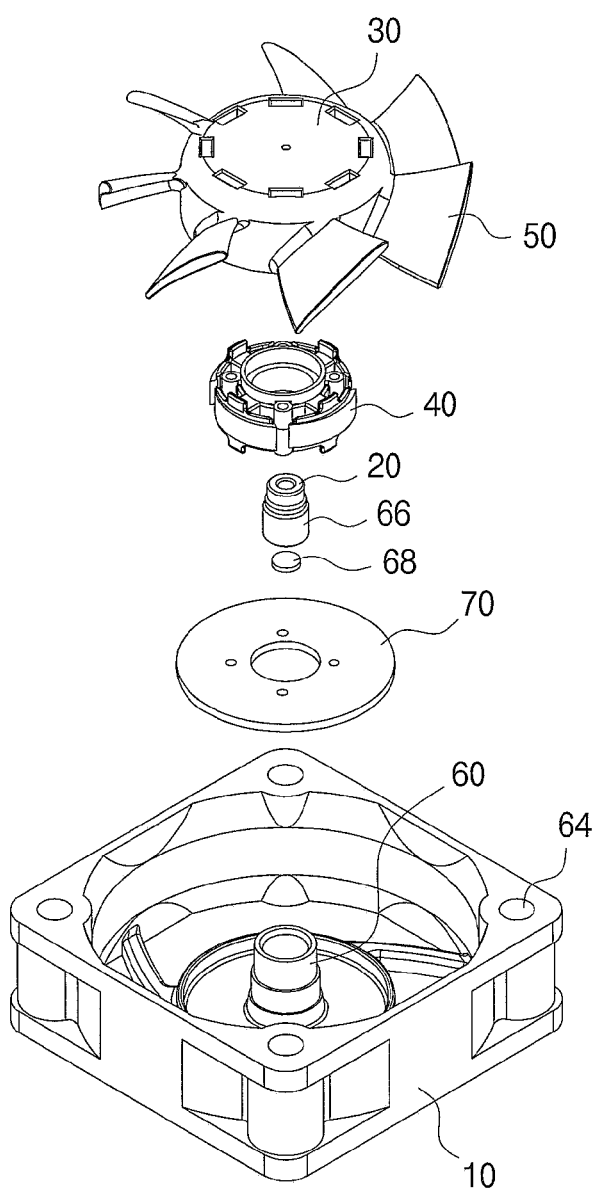
FIG. 1 is an exploded perspective view of a cooling fan according to an embodiment of the present invention.

Hereinafter, embodiments of the present invention will be described in detail with reference to the accompanying drawings. The sizes and shapes of the components shown in the drawings may be exaggerated for clarity and convenience. In addition, terms defined in consideration of the configuration and operation of the present invention may vary depending on the intention or custom of the user, the operator, and the like. Definitions of these terms should be based on the content of this specification.

Figure 2:
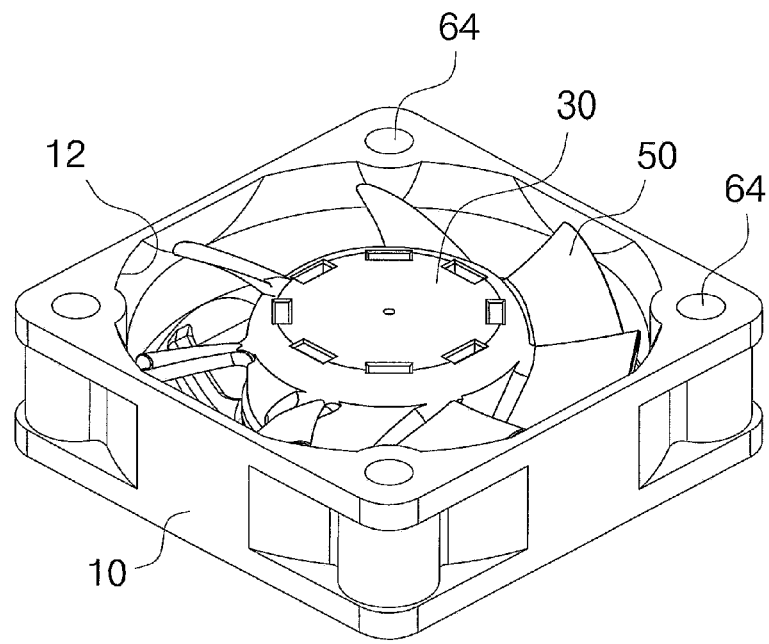
FIG. 2 is a perspective view of a cooling fan according to an embodiment of the present invention.
Figure 3:
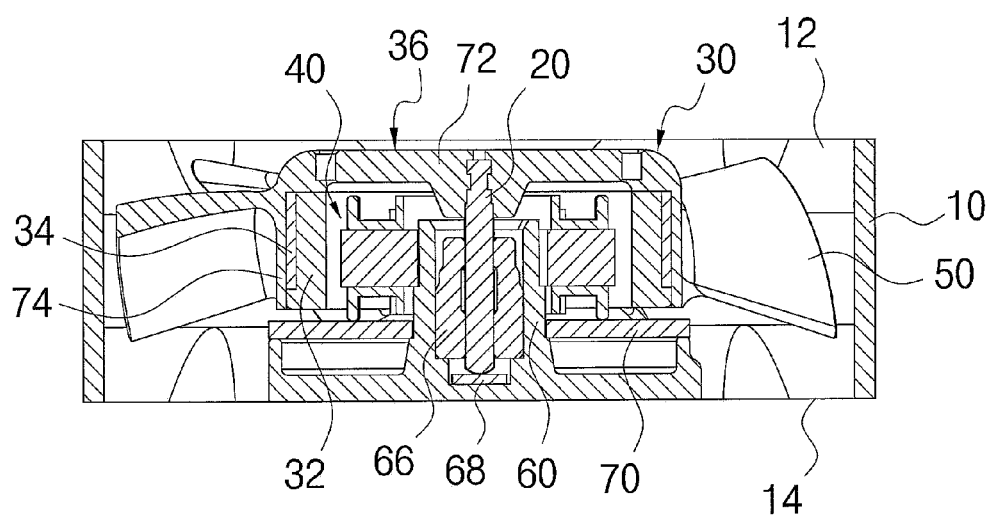
FIG. 3 is a cross-sectional view of a cooling fan according to an embodiment of the present invention.

Referring to FIGS. 1 to 3, a cooling fan according to an embodiment of the present invention includes: a fan housing 10 in which an air discharge port 12 through which air is discharged is formed on a front side of the fan housing 10, and an air inlet port 14 through which air is introduced into a rear surface thereof; a rotary shaft 20 rotatably supported by the fan housing 10; a rotor 30 fixed to the rotary shaft 20; a stator 40 fixed to the fan housing 10 and disposed at a predetermined gap from the rotor 30; and an impeller 50 connected to the rotor 30 and rotating together with the rotor 30.

The fan housing 10 has a front surface and a rear surface open to allow air to pass through, and a support portion 60 to which the stator 40 is fixed and which is formed in the center thereof while the rotary shaft 20 is rotatably supported in the center thereof.

Figure 6:
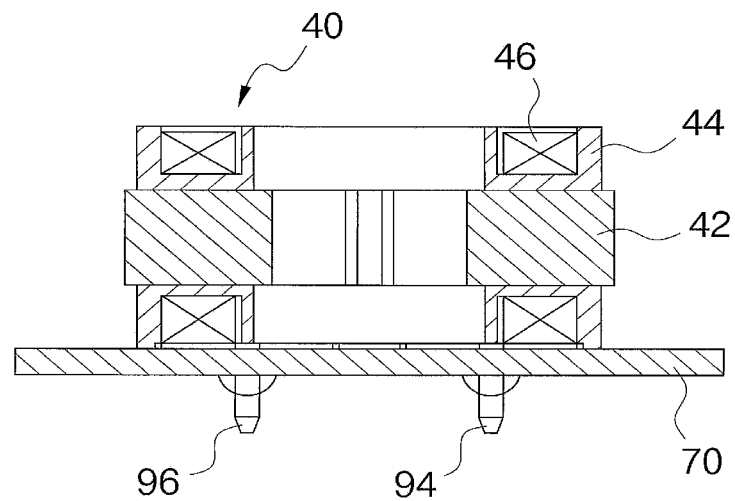
FIG. 6 is a cross-sectional view of a stator core according to an embodiment of the present invention, in which the stator core is coupled to the PCB.

Referring to FIG. 6 to be described later, the stator 40 includes a stator core 42 fixed to the outer circumferential surface of the support portion 60, a bobbin 44 mounted on the outer surface of the stator core 42, and a coil 46 wound around the bobbin 44 and through which electric power is applied.

A printed circuit board (PCB) 70 is mounted on the lower side of the stator 40, and the PCB 70 is equipped with various circuit components required for cooling fan control and a Hall sensor for measuring the number of revolutions of the rotor 30. The coil 46 of the stator 40 is electrically connected to a cable for external power connection.

The rotor 30 includes a magnet 32 which is disposed with a certain gap on the outer circumferential surface of the stator 40 and formed in a cylindrical shape, a back yoke 34 disposed on the outer circumferential surface of the magnet 32, and a rotor support 36 to which the magnet 32 and the back yoke 34 are fixed and the impeller 50 is connected.

The rotor support 36 includes a disk portion 72 having a rotary shaft 20 connected to the center thereof and formed in a disk shape, and a cylindrical portion 74 vertically extending from the edge of the disk portion 72, and on the inner surface of which the magnet 32 and the back yoke 34 are fixed, and on the outer surface of which the impeller 50 is formed.

The impeller 50 is integrally formed with the rotor support 36 on the outer circumferential surface of the rotor support 36. That is, the impeller 50 and the rotor support 36 are formed by performing insert injection while the magnet 32, the back yoke 34, and the rotary shaft 20 are disposed in a mold, and the rotary shaft 20, the magnet 32 and the back yoke 34 are fixed on the rotor support 36.

Fastening holes 64 for fixing a mounting bracket on which a cooling fan is mounted are formed at the corners of the fan housing 10. The fastening holes 64 are formed to penetrate through the corners of the fan housing 10 and can be used to fix the cooling fan to the mounting bracket by bolt fastening, bonding, or fitting.

The support portion 60 is formed in a cylindrical shape in the center of the fan housing 10, and on the inner surface of which the rotary shaft 20 is rotatably inserted, and on the outer surface of which the stator 40 is fixed.

The rotary shaft 20 is rotatably supported by a sleeve bearing 66 on the inner surface of the support portion 60, and a bushing 68 is mounted on the bottom surface of the support portion 60 in which the lower end of the rotary shaft 20 is rotatably contacted on the bottom surface of the support portion 60.

Since the driving force of the cooling fan is generated using an electromagnetic field, electromagnetic waves generated by the electromagnetic field are generated, and thus the driving output of the motor may be reduced. In addition, the function of the electronic equipment of the system equipped with the cooling fan may be reduced, and there may be a risk that static electricity is generated and damage to circuit components occurs.

In the present invention, the stator core 42 made of a metallic material and the ground of the PCB 70 are directly electrically connected to expand a ground area, thereby improving EMI shielding and static electricity improvement performance.

Figure 4:
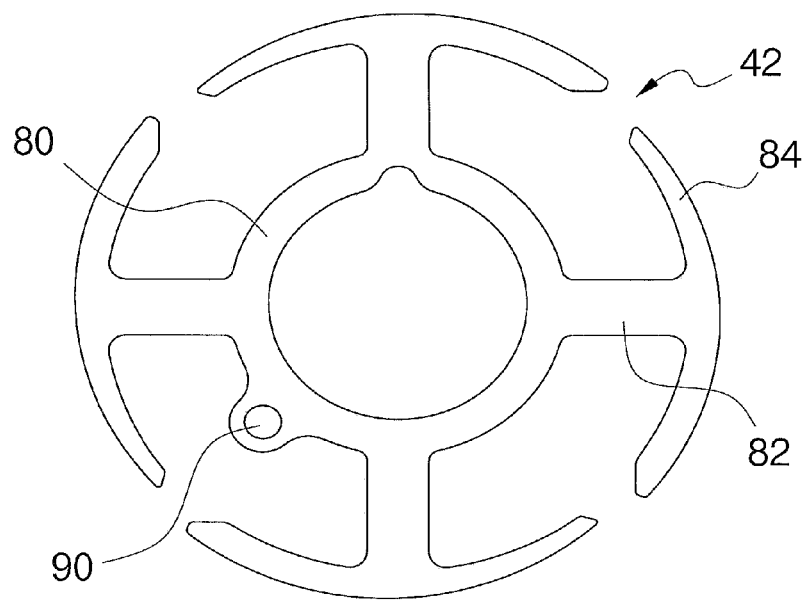
FIG. 4 is a plan view of a stator core according to an embodiment of the present invention.
Figure 5:
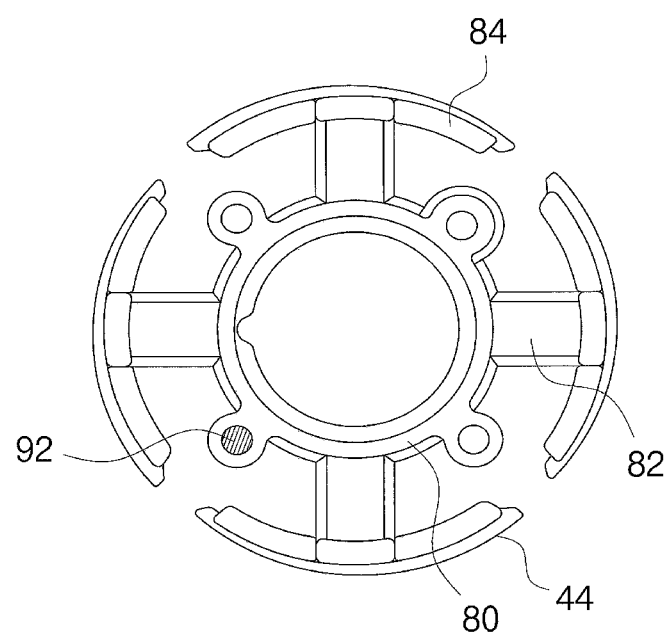
FIG. 5 is a plan view of a stator core according to an embodiment of the present invention, in which a bobbin is coupled to the stator core.

As shown in FIGS. 4 and 5, the stator core 42 which is stacked and formed in a plurality of stator core pieces and includes: an inner surface portion 80 which is formed in a circular ring shape to be inserted into the outer surface of the support portion 60; a coil winding portion 82 which is formed at regular intervals in the circumferential direction from the outer surface of the inner surface portion 80, and on which the coil 46 is wound; an outer surface portion 84 formed in an arc shape at the end of the coil winding portion 82 and disposed to face the magnet 32; and a ground portion in which the stator core 42 and the ground of the PCB 70 are directly connected to expand a ground area.

The ground portion includes: a connection hole portion 90 formed integrally with the stator core 42; and a joint pin 92 inserted into the connection hole portion 90 and electrically connected to the stator core 42 and connected to the ground of the PCB 70.

The connection hole portion 90 is formed to protrude outside the inner surface portion 80 of the stator core 42 and electrically connected to the joint pin 92 in which the joint pin 92 is inserted into the connection hole portion 90. The connection hole portion 90 is formed between the two coil winding portions 82 so as not to interfere with the coil 46 wound around the coil winding portion 82 of the stator core 42.

The joint pin 92 is formed of a metal conductor and is electrically connected to all of the plurality of pieces of stator cores when inserted into the connection hole portion 90. In addition, the lower end of the joint pin 92 is soldered to the PCB 70 and is electrically connected to a pattern that is formed on the PCB 70 to serve as a ground.

That is, the stator core 42 is stacked and a plurality of pieces of stator cores. When the connection hole portion 90 is formed in the stator core 42 and the joint pin 92 is inserted into the connection hole portion 90, all the plurality of pieces of stator cores 42 and joint pins 92 are electrically connected. When the joint pin 92 is connected to the ground of the PCB 70, all the stator cores 42 and the ground of the PCB 70 are electrically connected to greatly expand the ground area.

As shown in FIG. 5, the joint pin 92 is inserted into the connection hole portion 90 formed in the stator core 42 stacked and formed in a plurality of pieces of stator cores, after forming a bobbin 44 made of a resin material on an outer surface of the plurality of stacked stator cores 42.

Figure 7:
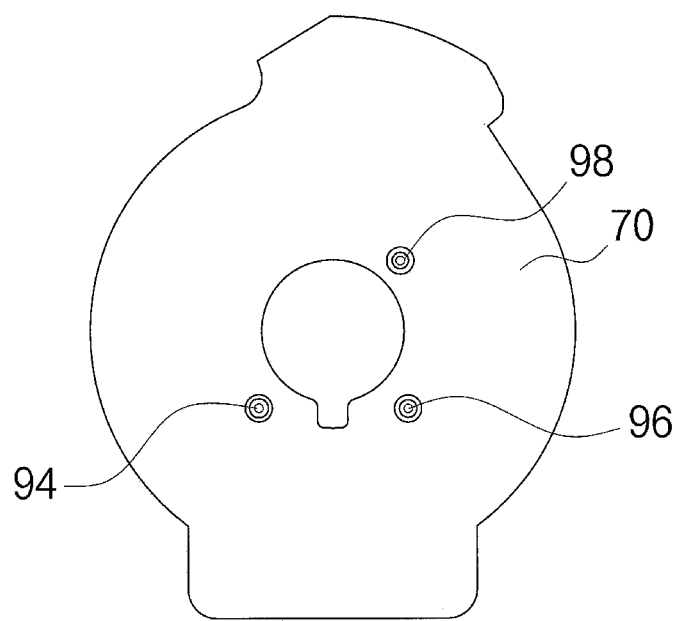
FIG. 7 is a rear view of a stator according to an embodiment of the present invention, in which the stator is coupled to the PCB.

In addition, as shown in FIGS. 6 and 7, a start line connection portion 94 to which a start line of the coil 46 is connected, an end line connection portion 96 to which an end line of the coil 46 is connected, and a connection portion 98 to which the joint pin 92 is connected are respectively formed on the PCB 70. It is preferable that each of the connection portions 94, 96 and 98 is connected by soldering.

Looking at the assembly process of the PCB 70 and the stator 40, when manufacturing the stator core 42, the connection hole portion 90 is integrally manufactured, and the stator core 42 is stacked in the plurality of pieces of stator cores, and then a bobbin 44 is formed on the outer surface of the stator core 42. Then, the joint pin 92 is inserted into the connection hole portion 90 to electrically connect the stator core 42 and the joint pin 92.

Then, the start line and the end line of the coil 46 are soldered on the PCB to electrically connect the coil and the PCB, and when the joint pin is shouldered to the ground of the PCB, assembly is completed.

In this way, the connection hole portion 90 is integrally molded during molding of the stator, and the joint pin 92 is simply assembled when the coil is soldered on the PCB, so the assembly process is simple. In addition, by electrically connecting the plurality of pieces of stator cores 42 and the ground of the PCB 70, it is possible to expand the ground area to minimize damage caused by static electricity and improve EMI shielding performance.

While the present invention has been particularly shown and described with reference to exemplary embodiments thereof, by way of illustration and example only, it is clearly understood that the present invention is not to be construed as limiting the present invention, and various changes and modifications may be made by those skilled in the art within the protective scope of the invention without departing off the spirit of the present invention.

INDUSTRIAL APPLICABILITY

The present invention can be usefully applied to cooling fans for preventing overheating of electronic devices, automobiles, LED lights, etc., in particular, cooling fans for preventing damage to circuit components due to static electricity and shielding EMI.

What is claimed is:

1. A cooling fan comprising:
   a rotary shaft rotatably supported by a fan housing;
   a rotor fixed to the rotary shaft;
   a stator including a plurality of stator cores which are fixed to the fan housing and arranged at a predetermined gap from a magnet of the rotor, in which the plurality of stator cores are stacked and on which a coil is wound;
   an impeller connected to the rotor;
   a printed circuit board (PCB) installed under the stator to control the cooling fan; and
   a grounding portion installed on the stator and electrically connected to a ground pattern of the printed circuit board (PCB) to expand a ground area,
   wherein the grounding portion comprises:
   a connection hole portion formed in the plurality of stator cores; and
   a joint pin which is inserted into the connection hole portion and electrically connected to the printed circuit board (PCB), and
   wherein a start line connection portion to which a start line of the coil is connected, an end line connection portion to which an end line of the coil is connected, and a joint pin connection portion to which the joint pin is connected are respectively formed on the printed circuit board (PCB).

2. The cooling fan of claim 1, wherein the plurality of stator cores include:
   an inner surface portion fixed to the fan housing; a coil winding portion formed at regular intervals in a circumferential direction from an outer surface of the inner surface portion on which the coil is wound; and
   an outer surface portion formed on an end of the coil winding portion and disposed to face the magnet of the rotor.

3. The cooling fan of claim 2, wherein the connection hole portion is formed in a ring shape on the inner surface portion, and formed in a position that does not interfere with the coil wound on the coil winding portion.

4. The cooling fan of claim 2, wherein the joint pin is inserted into the connection hole portion after forming a bobbin with the plurality of stator cores.

5. The cooling fan of claim 1, wherein the joint pin connection portion is connected to the ground pattern and is formed on the printed circuit board (PCB) to serve as a ground.

6. A cooling fan comprising:
   a rotary shaft rotatably supported by a fan housing;
   a rotor fixed to the rotary shaft;
   a stator including a plurality of stator cores which are fixed to the fan housing and arranged at a predetermined gap from a magnet of the rotor, in which the plurality of stator cores are stacked and on which a coil is wound;
   an impeller connected to the rotor;
   a printed circuit board (PCB) installed under the stator to control the cooling fan;
   a connection hole portion formed in a circular ring shape on the plurality of stator cores; and
   a joint pin inserted into the connection hole portion and electrically connected to the plurality of stator cores, one end of which is electrically connected to a ground pattern of the printed circuit board (PCB),
   wherein a start line connection portion to which a start line of the coil is connected, an end line connection portion to which an end line of the coil is connected, and a joint pin connection portion to which the joint pin is connected are respectively formed on the printed circuit board (PCB).

* * * * *